(12) United States Patent
Najork et al.

(10) Patent No.: US 12,145,538 B2
(45) Date of Patent: Nov. 19, 2024

(54) ROCK PROCESSING PLANT

(71) Applicant: Kleemann GmbH, Göppingen (DE)

(72) Inventors: Jens-Oliver Najork, Heiningen (DE);
Lars Rudolph, Stuttgart (DE); Nils Rudolph, Stuttgart (DE)

(73) Assignee: Kleemann GmbH, Göppingen (DE)

( * ) Notice: Subject to any disclaimer, the term of this patent is extended or adjusted under 35 U.S.C. 154(b) by 1106 days.

(21) Appl. No.: 16/940,506

(22) Filed: Jul. 28, 2020

(65) Prior Publication Data
US 2021/0031695 A1    Feb. 4, 2021

(30) Foreign Application Priority Data

Jul. 30, 2019 (DE) ...................... 10 2019 120 582.4

(51) Int. Cl.
*B60R 3/00* (2006.01)
*B02C 21/02* (2006.01)
(Continued)

(52) U.S. Cl.
CPC .............. *B60R 3/005* (2013.01); *B02C 25/00* (2013.01); *E04G 3/00* (2013.01); *E04G 5/14* (2013.01); *B02C 21/026* (2013.01); *B07B 1/005* (2013.01)

(58) Field of Classification Search
CPC ....... B02C 21/02; B02C 21/026; B02C 23/04; B60R 3/005
See application file for complete search history.

(56) References Cited

U.S. PATENT DOCUMENTS

| | | |
|---|---|---|
| 7,168,644 B2 | 1/2007 | Togashi et al. |
| 2009/0173671 A1* | 7/2009 | O'Keeffe ................. B07B 1/46 209/421 |

FOREIGN PATENT DOCUMENTS

| | | | |
|---|---|---|---|
| DE | 60314729 T2 | 11/2007 | |
| EP | 2883624 A1 * | 6/2015 | ........... B02C 21/026 |

(Continued)

OTHER PUBLICATIONS

Office action of Jul. 8, 2020 in corresponding German application 10 2019 120 582.4 (not prior art).
(Continued)

*Primary Examiner* — Christopher L Templeton
*Assistant Examiner* — P Derek Pressley
(74) *Attorney, Agent, or Firm* — Lucian Wayne Beavers; Patterson Intellectual Property Law, PC

(57) ABSTRACT

The invention relates to a rock processing plant (10) having a process unit (20), to which a working platform (30) that can be walked on is assigned, wherein the process unit (20) has a projection (24.5), which protrudes into the working area formed by the working platform (30), wherein the working platform (30) has a fall arrester (35), in particular in the form of a guardrail, and wherein the working platform (30) has a platform widening (33) in the area of the projection (24.5) to create a working area adjacent to the projection (24.5). To improve occupational safety the invention provides that the platform widening (33) has a floor segment (33.1) as a working surface, which is swivel mounted such that it can be folded or swiveled between a folded-down working position, in which the floor segment (33.1) can be walked on, and an upright transport position, that the fall arrester (35) is guided in the area of the platform widening (33), that at least one locking segment (36.6) is directly or indirectly coupled to the floor segment (33.1) in such a way that when the floor segment (33.1) is moved, the locking segment (36.6) is moved, wherein in the transport position the locking segment (36.6) blocks the access to the projection (24.5) at least in some areas and in the working position the locking segment (36.6) is moved out of the access area.

16 Claims, 7 Drawing Sheets

(51) Int. Cl.
  *B02C 25/00* (2006.01)
  *B07B 1/00* (2006.01)
  *E04G 3/00* (2006.01)
  *E04G 5/14* (2006.01)

(56) References Cited

FOREIGN PATENT DOCUMENTS

| | | | |
|---|---|---|---|
| JP | 0871446 A | * | 3/1996 |
| JP | 08071446 A | * | 3/1996 |
| JP | 2007307481 A | * | 11/2007 |
| WO | 2007093645 A2 | | 8/2007 |

OTHER PUBLICATIONS

European Patent Office Action for corresponding patent No. 20186843.
7, dated Dec. 1, 2020, 6 pages.

* cited by examiner

ROCK PROCESSING PLANT

BACKGROUND OF THE INVENTION

1. Field of the Invention

The invention relates to a rock processing plant having a process unit, to which a working platform that can be walked on is assigned, wherein the process unit has a projection, which protrudes into the working area formed by the working platform, wherein the working platform has a fall arrester, in particular in the form of a guardrail, and wherein the working platform has a platform widening in the area of the projection to create a working area adjacent to the projection.

2. Description of the Prior Art

Rock processing plants are used for various purposes. They are used, for instance, to crush and/or screen recycling and/or rock material during processing. These machines can be used either as mobile or as stationary units. A feed unit is used to feed the material to be processed into the plant. Excavators are usually used for this purpose. The excavator deposits the material to be crushed or screened out in a conveyor chute of the feed unit. Starting from the feed unit, a conveyor device is used to convey the material to be processed to a downstream screening unit in the conveying direction. In the subsequent process unit, the material is then processed, for example crushed or screened.

Working platforms are attached adjacent to the rock processing plant. The machine operator can move thereon for maintenance or control purposes.

A rock processing plant is a machine having considerable external dimensions. Flatbed trucks are used to move them to their place of work. The external dimensions must be such that they can be transported in accordance with the legal provisions. Working platforms often prove to be difficult in this respect, in particular where the maximum installation space is limited in width. Sometimes the machine design is then selected in such a way that machine components form projections that protrude into the area of the working platform. The operating personnel then has to climb over these projections when walking on the working platform, which is to be avoided for safety reasons. To avoid this, platform widenings are sometimes used for walking around the projection. However, this will then adversely affect the external dimensions of the machine.

SUMMARY OF THE INVENTION

The invention addresses the problem of providing a compact rock processing plant of the type mentioned above for transport purposes, which meets the requirements of occupational safety where a projection of a machine component protrudes into the working area of the working platform.

Accordingly, it is provided that the platform widening has a floor segment as a working surface, which is swivel mounted in such a way that it can be folded or swiveled between a folded-down working position, in which the floor segment can be walked on, and an upright transport position. In this type of rock processing plant, the floor segment can be folded for transport purposes, i.e. the widening of the platform does not, or not significantly, affect the dimensions of the machine. Once the machine has been moved to the place of work, the floor segment can be folded into the working position. According to the invention, it is also provided that the fall arrester is installed in the area of the platform widening. In this way, occupational safety is ensured when the floor segment has been folded down and is in the working position. The operating personnel can then safely walk around the area of the projection. To prevent the operating personnel from climbing over the projection when the floor segment is in its folded transport position, the invention provides that at least one locking segment is directly or indirectly coupled to the floor segment in such a way that when the floor segment is moved, the locking segment is moved, wherein in the transport position, the locking segment blocks the access to the projection at least in some areas and in the working position, the locking segment is moved out of the access area. The locking segment then blocks the access to the projection. It can then no longer be easily climbed over, resulting in a further improvement in occupational safety.

Preferably, the locking segment is permanently coupled to the floor segment. In this way, when the floor segment is swiveled, the locking segment is also forcibly moved. In this way, the locking segment reliably blocks the path to the projection when the floor segment is in its folded position.

For optimized number of parts and assembly work, it may be provided that the locking segment(s) is/are part of the fall arrester.

In accordance with a preferred variant of invention, it may be provided that the fall arrester has a guardrail segment, which is present in the area of the platform widening, that a further guardrail segment adjoins the platform widening on one or both sides, and that the guardrail segment of the platform widening has the locking segment and that this guardrail segment can be swiveled relative to the adjoining further guardrail segment(s).

Adjacent to the widening of the platform, the working platform may have at least one adjoining guardrail segment. Preferably, this is a guardrail segment of a fixed platform segment which does not adversely affect the overall width of the machine. A user can access the platform widening from this platform segment. Because the guardrail segment, which is assigned to the platform widening, can be swiveled and has the locking segment, it can be swiveled for transport purposes to save space, wherein simultaneously the locking segment can be moved into the locking position. This makes for a very simple operation.

If provision is made that the floor segment in the upright transport position covers the projection at least in part laterally, the machine component forming the projection is protected.

A conceivable embodiment of the invention is such that the process unit has a boundary, which limits the working platform on the side facing away from the fall arrester, that the projection protrudes from the boundary, and that in the transport position the locking segment extends between the boundary and the upright floor segment. In the working position of the platform widening, the user can move safely between the boundary and the fall arrester. In the transport position, the locking segment blocks this area.

In accordance with one variant of the invention, a simple operability is achieved by the fall arrester having a handrail, which extends at least in some areas in the direction of the longitudinal extension of the floor segment, and in that the handrail is arranged for swivel mounting of the floor segment, preferably at least in some areas eccentrically to the latter, in such a way that it can be used to transfer a force to move the floor segment between the working position and the transport position. The handrail thus also serves as a handle that is easily accessible and which can be used to move the fall arrester and therewith the floor segment.

According to a further alternative solution of the invention, provision may be made that the working platform has two platform segments, wherein the platform segments are transferred into one another by means of the platform widening, that the fall arrester has two locking segments, that the first locking segment in the transport position blocks the access from the first platform segment and the second locking segment in the transport position blocks the access from the second platform segment. In this way, a double-sided protection of the projection against unauthorized access can be achieved with little construction effort. If it is also provided that the two locking segments are intercoupled such that when the floor segment is moved from the working position to the transport position, they are simultaneously moved along, then a simple operation becomes possible. In particular, if the fall arrester is swiveled from one platform segment, the access on the opposite side can also be blocked simultaneously.

According to a variant of invention, provision may also be made that a control lever is coupled to the floor segment via a control joint, that a further control joint is used to couple the control lever directly or indirectly to the locking segment, and that the locking segment can be swiveled about a swivel axis formed by a, preferably fixed, joint, wherein the further control joint and the joint are arranged at a distance from each other. The control lever is used to intercouple, in particular to permanently couple, the motions of the floor segment and the locking segment. When the locking segment is swiveled around the joint, the control lever takes the floor segment along and swivels it as well. This makes for an easy operability. If a fixed joint is used, around which the locking segment swivels, then the kinematics become simple. In particular, provision may also be made for in this context, that the floor segment can be swiveled about an axis of rotation or a swivel axis by means of at least one floor joint. In particular, this may be a fixed bearing. If it is further provided that this floor joint, the two control joints and the joint form a four-joint system, then the guide is particularly stable. The second control joint and the joint can be assigned in particular to fall arrester. The control lever renders a stable coupling of the fall arrester to the floor segment possible, which contributes to an improved stability.

A stable coupling of the control lever to the floor segment is particularly easy to achieve if provision is made that the floor segment has a delimiting section, which rises from the floor segment in the working position, and that the control lever is articulated to the delimiting section by means of the control joint. In particular, provision may also be made that the delimiting section is angled integrally from the floor segment.

A rock processing plant according to the invention can also be such that the guardrail segment comprises the handrail and, spaced apart therefrom, a parapet, in particular a securing tube, wherein the parapet extends at least in part in the same direction as the handrail, and in that the handrail and the parapet are interconnected by means of at least one strut and/or by means of the locking segment. The handrail and the parapet reliably prevent falls when a user moves on the working platform. Because the locking segment is now integrated into this structure by connecting the handrail with the parapet, it has a double function. On the one hand, it braces the formed guardrail structure. On the other hand, in the transport position it is used to block any access to the projection.

A preferred embodiment of the rock processing plant according to the invention may in particular be such that the parapet has connection segments in the area of its longitudinal ends, which connection segments extend in the direction of the width of the platform widening, that bearing segments are formed in the area of the free ends of the connection segments, which bearing segments form the joints having a common axis of rotation, about which the guardrail segment can be swiveled. In this way, a stable swivel bearing for the guardrail segment is formed with little design effort.

To secure the position, provision may in particular be made that the working position and/or the transport position of the floor segment is/are secured by means of a positive-locking connection, for instance using a lynch pin, a bolt or a stop connection.

BRIEF DESCRIPTION OF THE DRAWINGS

The invention is explained in greater detail below based on an exemplary embodiment shown in the drawings. In the Figures.

DETAILED DESCRIPTION

Figure 1:
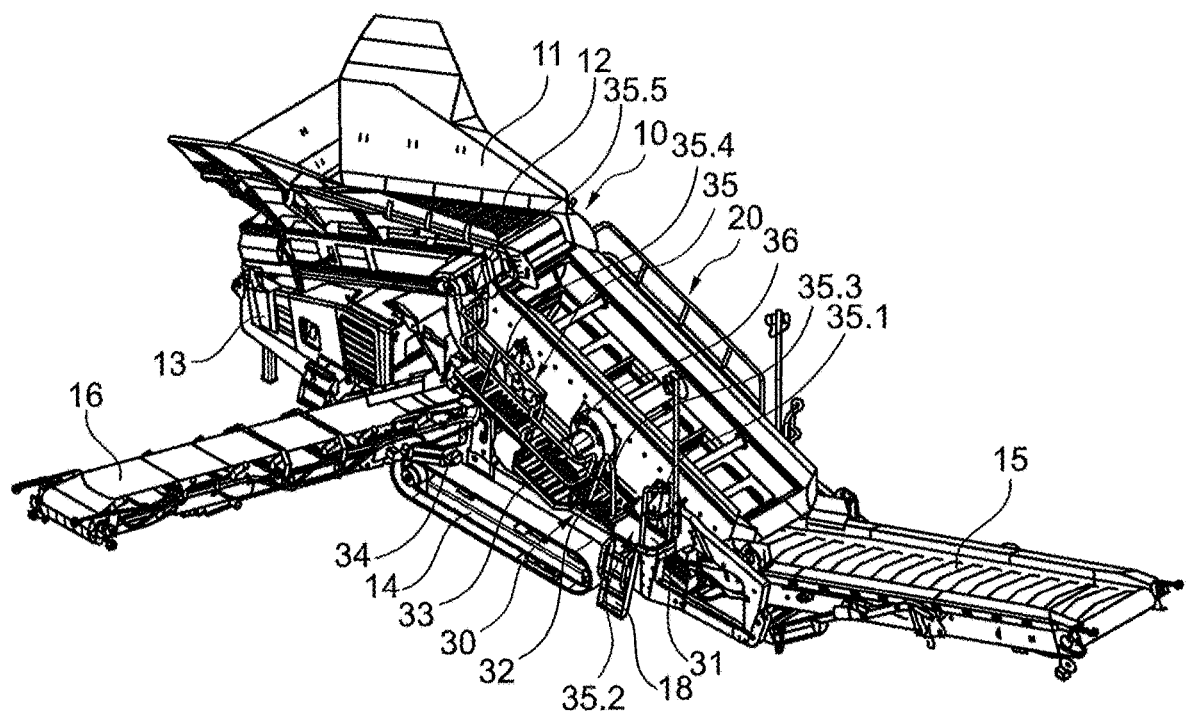
FIG. 1: shows a perspective view of a rock processing plant.

FIG. 1 shows a rock processing plant 10, which is used to explain the invention by way of example. The rock processing plant 10 shown is a screening machine. However, the invention is not limited to the application at a screening machine. On the contrary, the invention may also be applied to another rock processing plant, such as a rock crusher, in particular a jaw crusher or a rotary impact crusher. Furthermore, the invention can also be applied to combined rock crushing plants having screening stations. The explanations below are therefore only described based on a screening plant by way of example. The explanations below therefore apply to the rock processing plants mentioned above.

As FIG. 1 shows, the rock processing plant 10 has a machine frame 13, which is supported by undercarriages 14, which are designed as crawler tracks, for instance. Furthermore, the rock processing plant 10 has a feed hopper 11. It can be used to feed rock material to be processed into the former. A hopper discharge conveyor 12 is provided in the area of the feed hopper 11.

Figure 2:
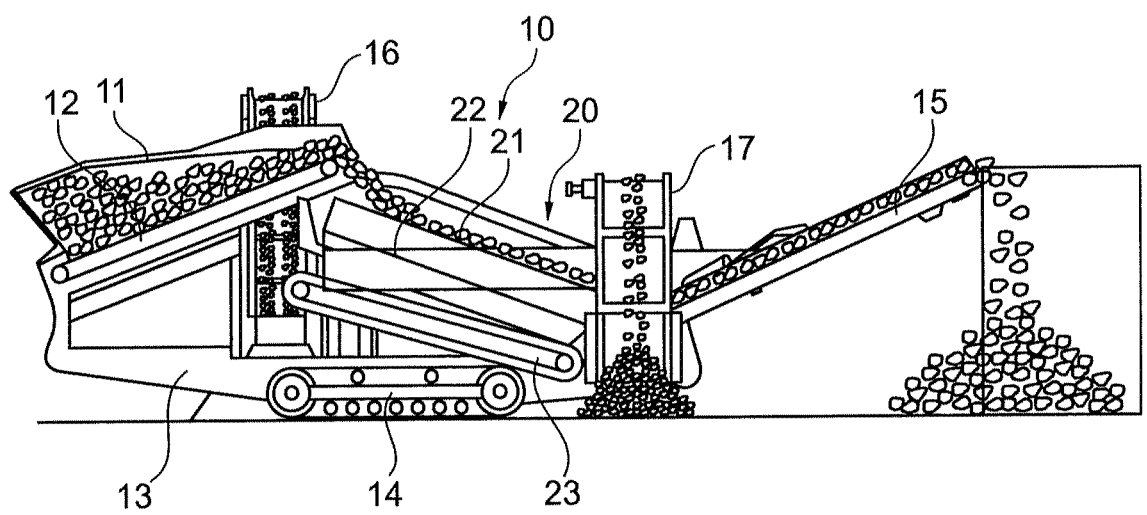
FIG. 2: shows a side view of a schematic representation of the rock processing plants in accordance with FIG. 1, FIG. 3: shows a perspective side view of a detail of the rock processing plants taken from FIG. 1, FIG. 4: shows a changed perspective of the detail in accordance with FIG. 3.

Adjacent to the feed hopper 11, the rock processing equipment 10 has a process unit 20. The process unit 20 in this case is a screen device. The design and function of this screen device is explained in more detail below with reference to FIG. 2. As this diagram shows, the process unit 20 has a screen deck 21 downstream of the hopper discharge conveyor 12. The rock material is conveyed onto this screen deck by means of the hopper discharge conveyor 12. The screen deck 21 has a screen grate having a predetermined mesh size. Rock material which cannot fall through the screen deck 21 due to its size is conveyed onto a conveyor belt 15 and from there onto a dump pile. The rock material that falls through the screen deck 21 reaches the screen deck 22. The screen deck 22 in turn has a predetermined mesh size. Rock material that does not fall through the screen deck 22 is fed to a conveyor belt 17. This conveyor belt 17 extends laterally out of the working area of the process unit 20. The screened-out material is piled up, as shown in FIG. 2. The screen material, which falls through the screen deck 22, reaches a conveyor 23, for instance an endlessly circulating conveyor belt. The screened-out fine material is routed to a conveyor belt 16 and discharged from the working area of the machine. The screened-out fine material is piled up again on the side of the machine. The two screen decks 21 and 22 are driven by means of vibration drives, especially eccentric drives.

The conveyor belt 15 can be moved to a lower position such that the overflow upper deck material of the screen deck 21 and the overflow lower deck material of the screen deck 22 are discharged via the conveyor belt 15 and thus only two screen fractions are screened out. Accordingly, only one lateral conveyor belt 16 has been installed and the second lateral conveyor belt 17 has been omitted or has either been dismantled or moved to a position/arrangement at the plant in which this conveyor belt is accordingly out of function.

Furthermore, it is conceivable that the conveyor belt 16 and the conveyor belt 17 can be attached to either side of the machine, as shown in FIG. 1 compared to FIG. 2. Furthermore, it is conceivable that the conveyor belt 16 and the conveyor belt 17 are located on the same side of the plant.

As FIG. 1 shows, the machine has working platforms 30 on both longitudinal sides of the machine. The working platforms 30 are each accessible via a means of ascent 18, for instance a ladder. The working platform 30 is shown more clearly in FIG. 3. As can be seen from this diagram, an access platform 31 is provided above the means of ascent 18. The access platform 31 merges into an inclined platform segment 32. This fixed platform segment 32 adjoins a platform widening 33. The platform widening 33 merges into a further fixed platform segment 34. The platform segments 32, 34 have a walk-on access area, which merges into a floor segment 33.1 of the platform widening 33.

Figure 3:
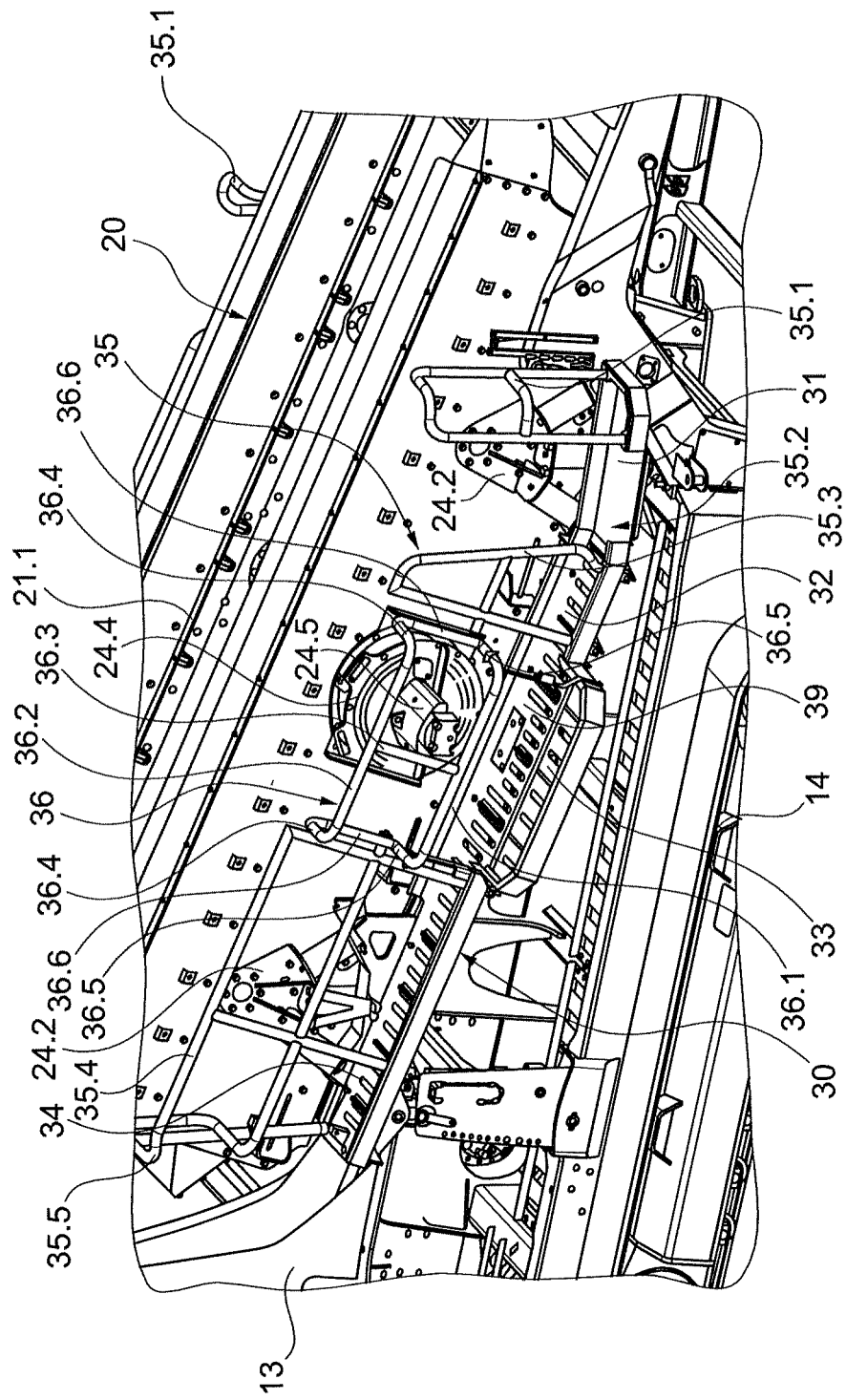

As FIG. 3 clearly shows, the working platform 30 is delimited on one side by a boundary 24 of the process unit 20. The boundary 24 may, for instance, be formed like a wall extending in the longitudinal direction of the working platform 30 and thus in the longitudinal direction of the rock treatment device 10.

A component of the process unit 20 is connected to the boundary 24. This component has a projection 24.5, which protrudes beyond the boundary 24 on the outside. The projection 24.5 protrudes beyond a floor area 39, which extends below the projection 24.5. The floor area 39 is in alignment with the two platform segments 32 and 34.

In the working position shown in FIG. 3, the floor segment 33.1 of the platform widening 33 protrudes laterally beyond the platform segments 32, 34. In this way, a user moving on the working platform 30 can bypass the projection 24.5 when walking between the two platform segments 32, 34 without having to climb over the former.

Figure 5:
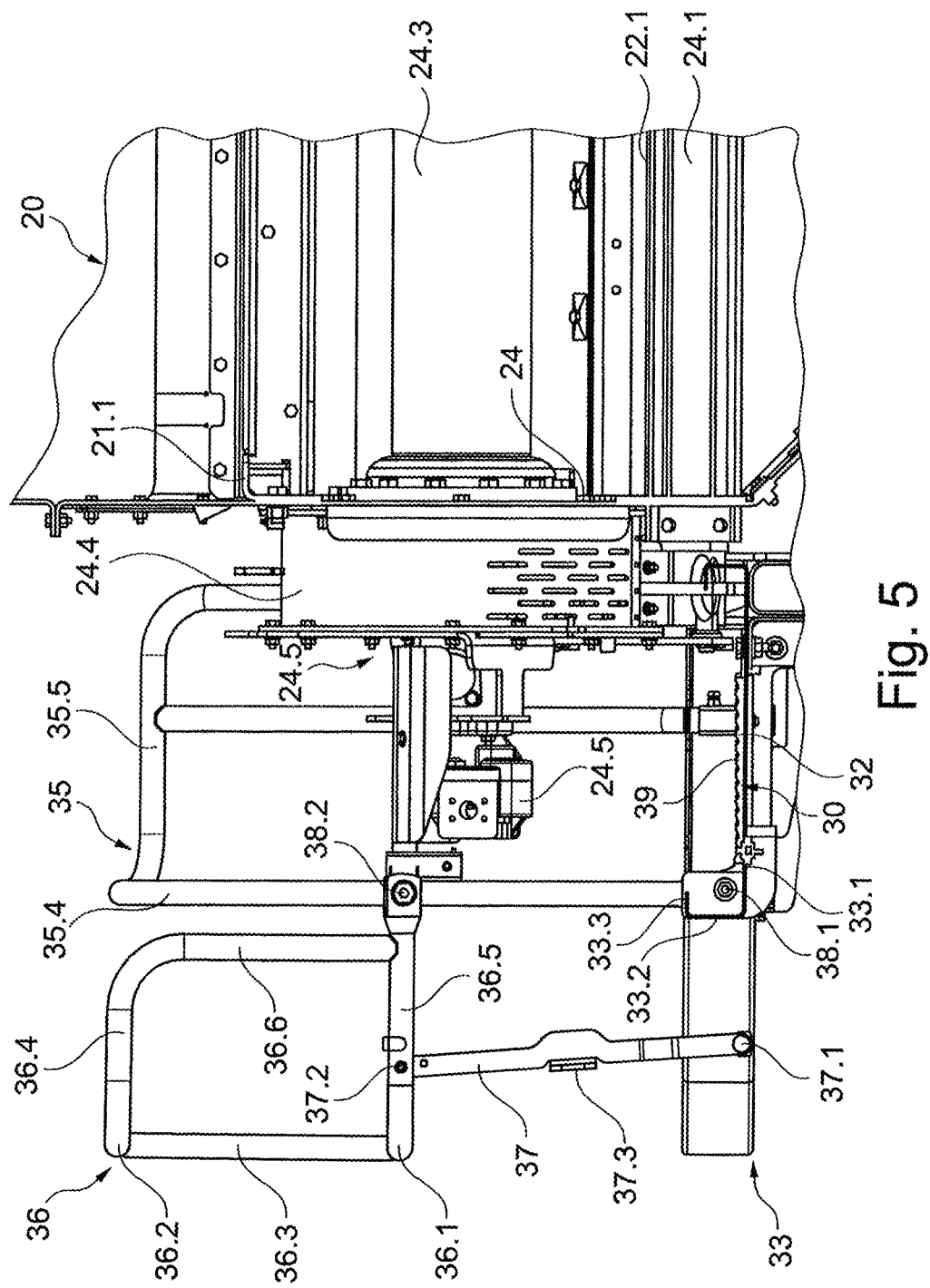
FIG. 5 shows a front view of the detail in accordance with FIGS. 3 to 4, FIG. 6: shows the representation in accordance with FIG. 3 but in a different operating position.

The arrangement of the projection 24.5 is particularly clear in FIG. 5. As this illustration shows, the projection 24.5 can include, for instance, a motor 24.6 and an eccentric gear 24.4, wherein the motor 24.6 drives the eccentric gear 24.4 to generate eccentric vibrations. The eccentric gear 24.4 is flanged to the boundary 24 and the motor 24.6 protrudes clearly beyond the boundary 24, projecting beyond the floor area 39 located below the projection 24.5.

Figure 4:
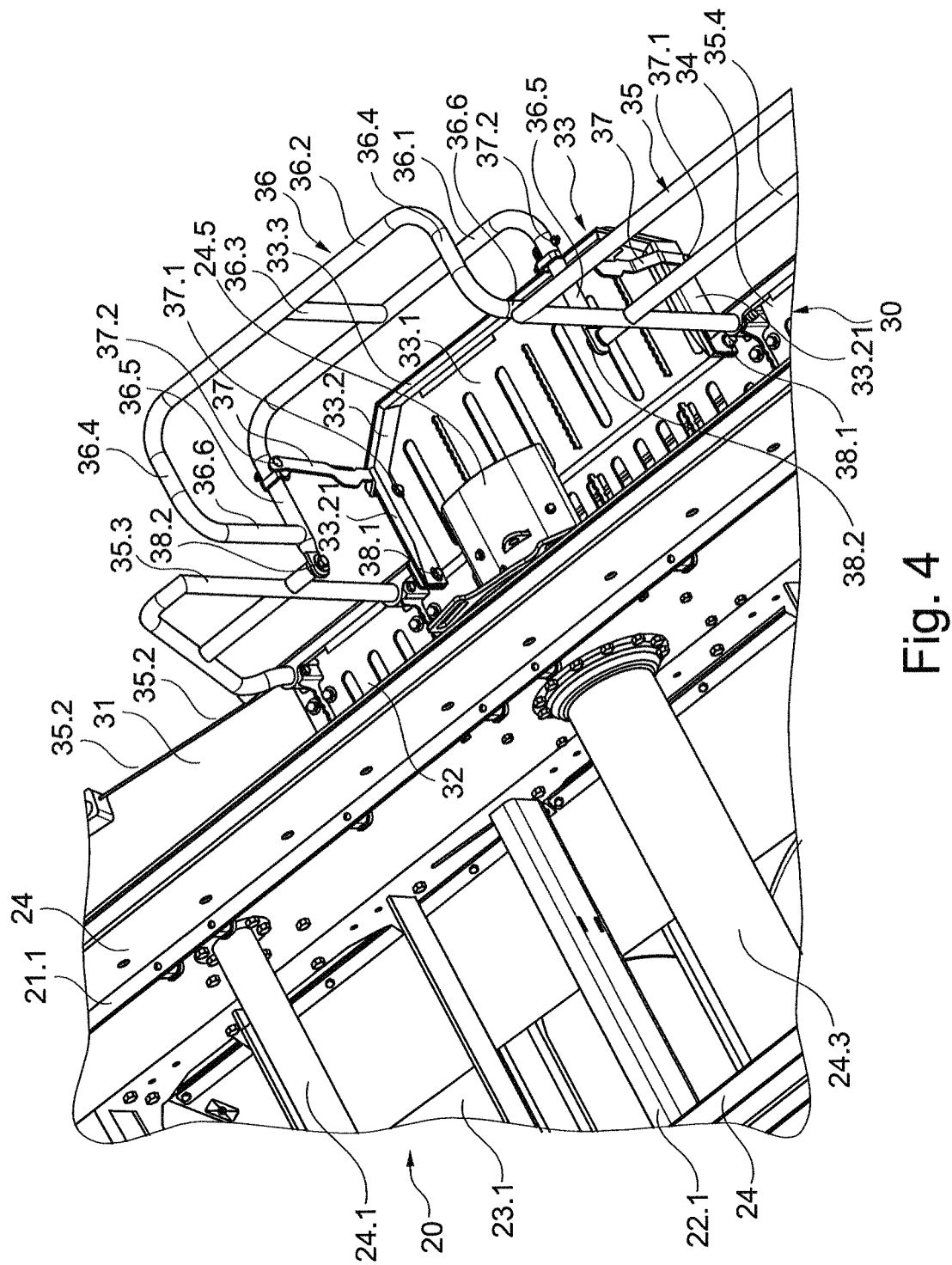

FIG. 4 shows that a working area of the process unit 20 is formed between two adjacent boundaries 24. An eccentric shaft, which is connected to the eccentric gear 24.4, is guided between the two boundaries 24 and extends protected inside a jacket pipe 24.3. FIG. 4 also shows a screen deck support 21.1, on which the screen deck 21 can be attached so as to be replaceable. Furthermore, a screen deck support 22.1 for the screen deck 22 is shown. Finally, means of conveyance 23.1 for the conveyor 23 are also shown. To brace the two boundaries 24 against each other, further struts 24.1 are provided, which extend between the boundaries in the working area. On the outside, support devices 24.2 are used to additionally bolt the struts 24.1 to the boundaries 24.

As FIG. 3 further shows, the working platform 30 is delimited by a fall arrester 35 on the end opposite from the boundary 24. The fall arrester 35 can have several segments. In this exemplary embodiment, the fall arrester has a parapet 35.1 in the area of access platform 31. Furthermore, a fixed guardrail segment 35.3 is arranged at a distance from parapet 35.1. This guardrail segment 35.3 is permanently assigned to the platform segment 32. An access area 35.2 is cut out of the fall arrester 35 between the parapet 35.1 and the guardrail segment 35.3. The access platform 31 is accessible from this access area 35.2 via the means of ascent 18.

A further guardrail segment 35.4 of the fall arrester is assigned to the platform segment 34. This guardrail segment 35.4 adjoins an end segment 35.5. It is used to bridge the area between the guardrail segment 35.4 and the boundary 24 of the process unit 20.

A guardrail segment 36 is formed between the two guardrail segments 35.3 and 35.4. This guardrail segment 36 is permanently assigned to the platform widening 33.

The design of the guardrail segment 36 is more clearly discernible in FIG. 4. As this illustration shows, the guardrail segment 36 has a handrail 36.2. This handrail 36.2 is preferably designed as a section segment, in particular as a hollow section.

The handrail 36.2 has a segment that extends along the length of the platform widening 33. Connection segments 36.4 are angled off this segment. These connection segments 36.4 extend in the direction of the width of the platform widening 33. The connection segments 36.4 each merge into a locking segment 36.6. The locking segment 36.6 is preferably bent integrally off the associated connection segment 36.4.

Below the handrail 36.2 and at a distance therefrom, there is a parapet 36.1. The parapet 36.1 may also have the form of a section segment, in particular a hollow section. At its two longitudinal ends, the parapet 36.1 has connection segments 36.5. These connection segments 36.5 may be bent integrally off the parapet 36.1 or may be designed as separate components, which are connected, in particular bolted, to the parapet 36.1.

The handrail 36.2 and the parapet 36.1 can be interconnected by one or, as shown in FIG. 4, by two locking segments 36.6. For instance, one or both locking segments 36.6 can be bent integrally off the handrail 36.2. The free ends of the locking segments 36.6 can, for instance, be connected, preferably welded, to the connection segments 36. Additionally or alternatively, it may be provided that the handrail 36.2 and the parapet 36.1 are connected by at least one strut 36.3.

The guardrail segment 36 forms bearing segments at the longitudinal ends. These bearing segments may, for instance, be formed by the ends of the connection segments 36.5. These bearing segments are coupled to, for instance, a strut of the adjacent fixed guardrail segment 35.3, 35.4 in a swiveling manner using a joint 38.2. The two joints 38.2 form a joint swivel axis.

As FIG. 4 further shows, the floor segment 33.1 is swivel mounted to floor joints 38.1. The two floor joints 38.1 form a joint swivel axis, which preferably extends in parallel to the floor segment 33.1. To form the two floor joints 38.1, for instance, an angled segment can be connected to floor segment 33.1, which forms a delimiting section 33.2 as an anti-slip device. This delimiting section 33.2 rises from the floor segment 33.1. Facing away from the floor segment 33.1, the delimiting section merges into an inwardly directed bend. This bend reinforces the delimiting section 33.2.

The delimiting section 33.2 has bearing segments 33.21 extending in the direction of the width of the platform widening 33. Bearing pins are passed through bearing seats of these bearing segments 33.21 and bearing blocks in alignment therewith, resulting in the floor joints 38.1.

Control levers 37 are located on opposite sides of the platform widening spaced apart from the joint axis formed by the floor joints 38.1, 33. The control levers 37 are each coupled to the parapet 36.1 and the floor segment 33.1 in a swiveling manner using control joints 37.1, 37.2. For instance, the assignment can be such that the control joint 37.1 is used to connect the control lever 37 in the area of the bearing segments 33.21. The second control joint 37.2 can be located in the area of the connection segment 36.5. The two control joints 37.1 and the two control joints 37.2 each form a joint swivel axis.

The arrangement of joints 38.2, floor joints 38.1 and control joints 37.1, 37.2 can be seen more clearly in FIG. 5. As this illustration shows, one joint 38.2, one floor joint 38.1 and two control joints 37.1, 37.2 each form a four-joint system which provides a stable and pivoting assignment of the floor segment 33 to the guardrail segment 36.

Based on the working position shown in FIGS. 1 to 5, the platform widening 33 can be brought into a transport position. This transport position is illustrated in FIGS. 6 and 7, for instance.

To move the platform widening 33 into the transport position, a user standing on the platform segment 32, for instance, can grab the guardrail segment 36 by the handrail 36.2 and pull it upwards. During this motion, the guardrail segment 36 swivels around the fixed swivel axis formed by the two joints 38.2. Because the guardrail segment 36 is permanently coupled to the floor segment 33.1 via the two control levers 37, a motion force is transferred into the floor segment 33.1. A torque is applied via the eccentric assignment of the control joint 37.1 to the floor joint 38.1. This torque causes the floor segment 33.1 to swivel from its folded-down working position shown in FIGS. 1 to 5 to the transport position shown in FIGS. 6 and 7. The swiveling motion occurs about the fixed swivel axis formed by the two floor joints 38.1.

Figure 6:
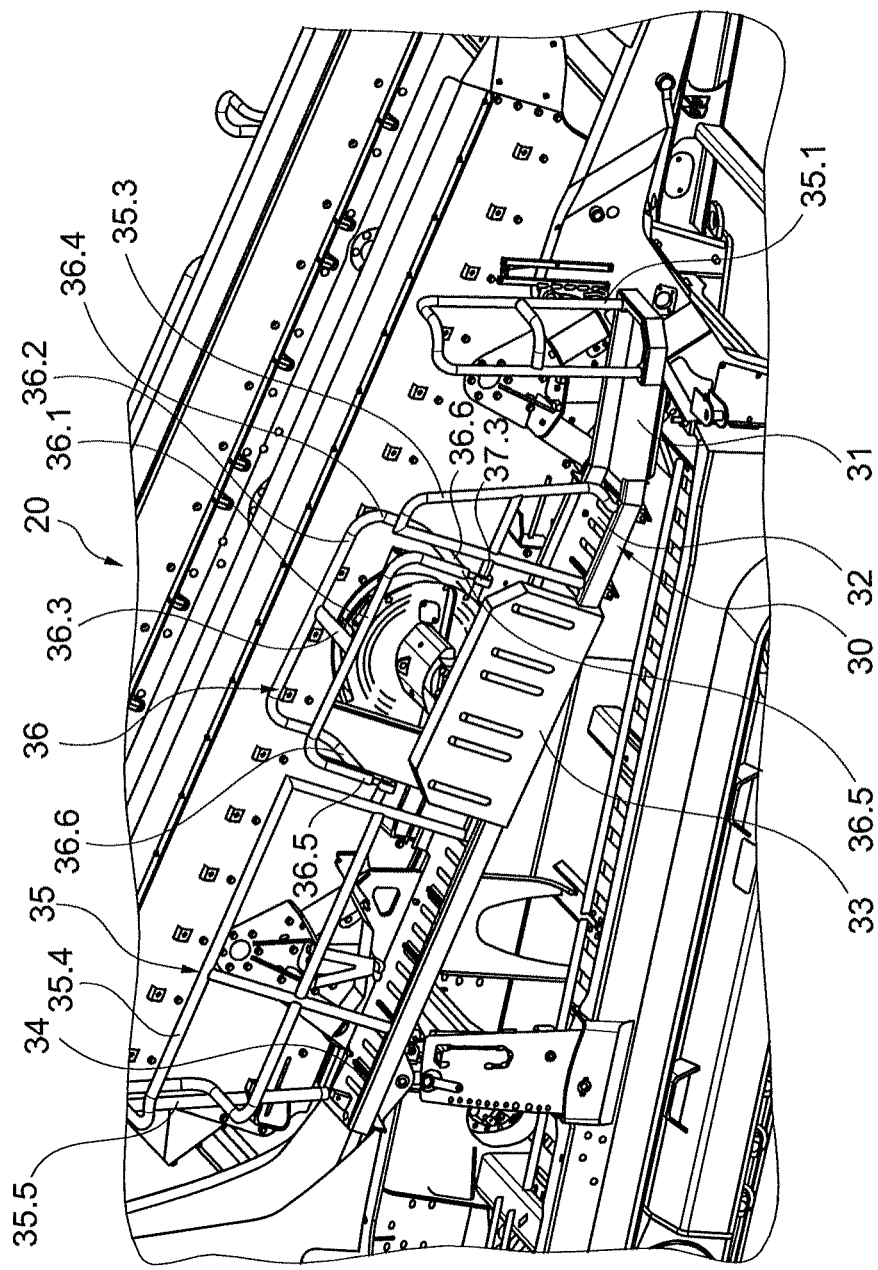
Figure 7:
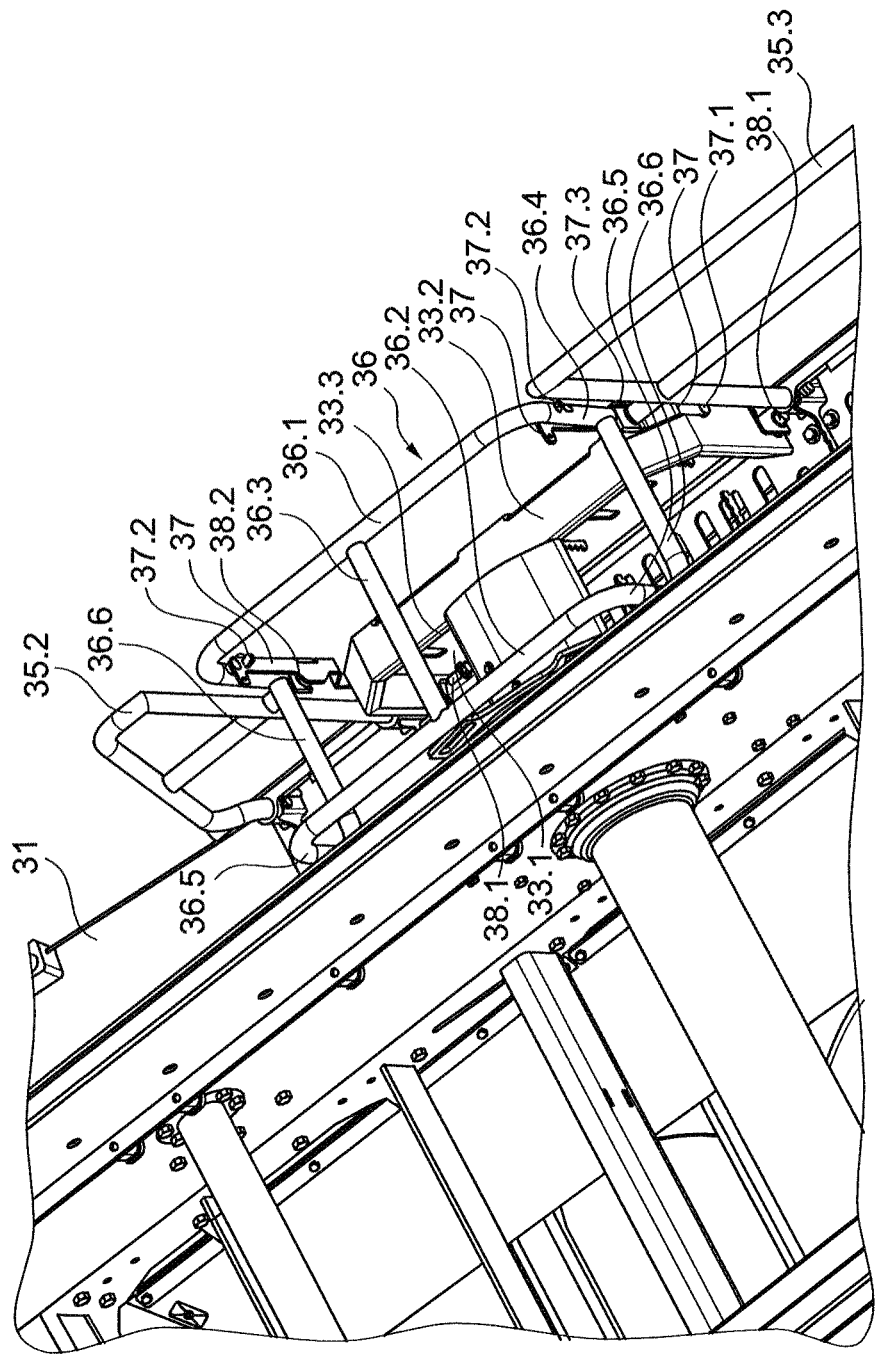
FIG. 7: shows the representation in accordance with FIG. 4 but in a different operating position in accordance with FIG. 6.

As FIGS. 5 to 7 show, at least one of the control levers 37 has a stop 37.3. This stop 37.3 can be used to limit the swivel motion. Then, the stop 37.3 hits a fixed component, in particular the bearing area in the area of joint 38.2. Preferably, a counter stop is formed by the guardrail segment 36 itself.

The folded transport position shown in FIGS. 6 and 7 can be locked by means of a form-locked connection, for instance by means of a bolt or the like.

In the folded transport position, the floor segment 33.1 covers the side of the projection 24.5 thus forming a lateral contact protection.

As FIGS. 6 and 7 further show, in the transport position the two locking segments 36.6 are arranged such that one locking segment 36.6 blocks the access from the first platform segment 32 and the second locking segment 36.6 blocks the access from the second platform segment 34. Accordingly, the locking segments 36.6 may also be referred to as blocking segments 36.6. It is particularly preferable that the height of the guardrail formed between the handrail 36.2 and the parapet 36.1 should essentially correspond to the width of the passage of the platform segments 32, 34, as shown in FIG. 7. In this case a space may be formed between the handrail 36.2 and the boundary 24. However, this space should just be sufficiently small to prevent a user from moving therethrough.

FIG. 7 also shows that, when the guardrail segment 36 is in the retracted position, the strut 36.3 is also positioned above the projection 24.5, thus forming a barrier which makes it even more difficult to climb over the projection 24.5.

To swivel the platform widening 33 back into its working position shown in FIGS. 1 to 5 after transport, only one safety device securing the shown transport position (e.g. bolts) has to be opened. Then the guardrail segment 36 can be gripped and the platform widening 33 swiveled outwards, resulting in the floor segment 33.1 and the guardrail segment 36 achieving their folded-down working position. This folded-down working position can also be locked using appropriate stops and/or form-locking connections, such as lock pins or the like.

The invention claimed is:

1. A rock processing plant, comprising:
a processing unit including a projection; and
a working platform configured to be walked on, the working platform defining a working area, wherein the projection of the processing unit protrudes into the working area, the working platform including:
a platform widening providing a widened portion of the working area adjacent to the projection, the platform widening including a floor segment swivel mounted such that the floor segment can be swiveled between a folded-down working position in which the floor segment can be walked on, and an upright transport position;
at least one blocking segment coupled to the floor segment such that the blocking segment is moved when the floor segment is swiveled, the at least one blocking segment being located to block access from the working platform to the projection at least partially when the floor segment is in the upright transport position, and the at least one blocking segment being moved so as to open the access from the working platform to the projection when the floor segment is moved back to the working position;
a fall arrester configured to prevent falls from the working platform, the fall arrester being present in the widened portion of the working area formed by the platform widening; and
a control lever coupled to the floor segment at a first control joint and coupled directly or indirectly to the at least one blocking segment at a second control joint;
wherein the at least one blocking segment is swiveled about a swivel axis when the floor segment is swiveled between the folded-down working position and the upright transport position; and wherein the second control joint is spaced from the swivel axis.

2. The rock processing plant of claim 1, wherein: the at least one blocking segment is a part of the fall arrester.

3. The rock processing plant of claim 2, wherein: the fall arrester includes:
- a first guardrail segment adjacent the widened portion of the working area formed by the platform widening;
- at least one further guardrail segment adjoining the platform widening on one or both sides of the platform widening; and
- wherein the first guardrail segment includes the at least one blocking segment, and the first guardrail segment can be swiveled relative to the at least one further guardrail segment.

4. The rock processing plant of claim 1, wherein: the floor segment in the upright transport position covers the projection at least in part laterally.

5. The rock processing plant of claim 1, wherein: the processing unit includes a boundary limiting the working platform on a side facing away from the fall arrester, the projection protruding from the boundary; and when the floor segment is in the upright transport position the at least one blocking segment extends between the boundary and the upright floor segment.

6. The rock processing plant of claim 1, wherein: the working platform extends in a longitudinal direction alongside the processing unit; and the fall arrester includes a handrail extending at least partially in the longitudinal direction, the handrail being swivel mounted and operably associated with the floor segment such that the handrail can be used to transfer a force to move the floor segment between the folded-down working position and the upright transport position.

7. The rock processing plant of claim 6, wherein: the handrail is swivel mounted eccentrically relative to the swivel mounting of the floor segment.

8. The rock processing plant of claim 1, wherein: the working platform includes first and second platform segments on opposite sides of the platform widening; and the at least one blocking segment is a part of the fall arrester, and the at least one blocking segment includes first and second blocking segments blocking access to the projection from the first and second platform segments, respectively, when the floor segment is in the upright transport position.

9. The rock processing plant of claim 8, wherein: the first and second blocking segments are intercoupled such that when the floor segment is moved from the folded-down working position to the upright transport position the first and second blocking segments are moved simultaneously with each other.

10. The rock processing plant of claim 1, wherein: the floor segment includes a delimiting section rising from the floor segment; and the control lever is articulated to the delimiting section by the first control joint.

11. The rock processing plant of claim 1, wherein: the floor segment swivels about at least one floor joint when the floor segment is swiveled between the folded-down working position and the upright transport position; and the floor joint, the first and second control joints, and the swivel axis form a four-joint system.

12. The rock processing plant of claim 1, wherein: the fall arrester includes a guardrail segment including a handrail, a parapet spaced apart from the handrail and extending at least in part in the same direction as the handrail, and at least one strut interconnecting the handrail and the parapet.

13. The rock processing plant of claim 12, wherein: the at least one blocking segment interconnects the handrail and the parapet.

14. The rock processing plant of claim 1, further comprising:
a positive-locking connection configured to secure the floor segment in the folded-down working position.

15. A rock processing plant, comprising:
a processing unit including a projection; and
a working platform configured to be walked on, the working platform defining a working area, wherein the projection of the processing unit protrudes into the working area, the working platform including:
- a platform widening providing a widened portion of the working area adjacent to the projection, the platform widening including a floor segment swivel mounted such that the floor segment can be swiveled between a folded-down working position in which the floor segment can be walked on, and an upright transport position;
- at least one blocking segment coupled to the floor segment such that the blocking segment is moved when the floor segment is swiveled, the at least one blocking segment being located to block access from the working platform to the projection at least partially when the floor segment is in the upright transport position, and the at least one blocking segment being moved so as to open the access from the working platform to the projection when the floor segment is moved back to the working position; and
- a fall arrester configured to prevent falls from the working platform, the fall arrester being present in the widened portion of the working area formed by the platform widening, the fall arrester including a guardrail segment including a handrail, a parapet spaced apart from the handrail and extending at least in part in the same direction as the handrail, and at least one strut interconnecting the handrail and the parapet;

wherein the parapet includes connection segments at longitudinal ends of the parapet, the connection segments extending in a direction of a width of the platform widening, the connection segments including free ends including bearing segments forming joints having a common axis of rotation about which the guardrail segment can be swiveled.

16. A rock processing plant, comprising:
a processing unit including a projection; and
a working platform configured to be walked on, the working platform defining a working area, wherein the projection of the processing unit protrudes into the working area, the working platform including:
- a platform widening providing a widened portion of the working area adjacent to the projection, the platform widening including a floor segment swivel mounted such that the floor segment can be swiveled between a folded-down working position in which the floor segment can be walked on, and an upright transport position;
at least one blocking segment coupled to the floor segment such that the blocking segment is moved when the floor segment is swiveled, the at least one blocking segment being located to block access from the working platform to the projection at least partially when the floor segment is in the upright transport position, and the at least one blocking segment being moved so as to open the access from the working platform to the projection when the floor segment is moved back to the working position;
a fall arrester configured to prevent falls from the working platform, the fall arrester being present in the widened portion of the working area formed by the platform widening; and
a positive-locking connection configured to secure the floor segment in the upright transport position.

* * * * *